US011513759B1

(12) United States Patent
Huttner et al.

(10) Patent No.: US 11,513,759 B1
(45) Date of Patent: Nov. 29, 2022

(54) SOUNDMARK INDICATING AVAILABILITY OF CONTENT SUPPLEMENTAL TO AUDIO CONTENT

(71) Applicant: Amazon Technologies, Inc., Seattle, WA (US)

(72) Inventors: Taylor J. Huttner, Highland Park, NJ (US); Daniel Chastney, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 16/712,826

(22) Filed: Dec. 12, 2019

(51) Int. Cl.
*G06F 3/16* (2006.01)
*G10L 25/51* (2013.01)
*G10L 15/22* (2006.01)

(52) U.S. Cl.
CPC .............. *G06F 3/165* (2013.01); *G06F 3/167* (2013.01); *G10L 15/22* (2013.01); *G10L 25/51* (2013.01); *G10L 2015/223* (2013.01)

(58) Field of Classification Search
CPC .... G01C 21/3629; G08B 25/001; G08B 7/06; H04M 1/6075; H04M 1/72442; H04M 2201/39; H04N 21/4394; H04N 21/8126; H04N 21/8456

USPC .......................................... 381/56–58, 77, 86
See application file for complete search history.

(56) References Cited

U.S. PATENT DOCUMENTS

| | | | | |
|---|---|---|---|---|
| 2012/0324324 A1* | 12/2012 | Hwang | ................... | G11B 27/11 715/203 |
| 2015/0296288 A1* | 10/2015 | Anastas | ................ | G10L 19/018 381/77 |
| 2018/0081618 A1* | 3/2018 | McLean | ................ | H04L 65/611 |

* cited by examiner

*Primary Examiner* — George C Monikang
(74) *Attorney, Agent, or Firm* — Eversheds Sutherland (US) LLP

(57) ABSTRACT

Devices, systems, and methods are provided for using a soundmark to indicate availability of supplemental content. A method may include presenting, by a device, first narrated content from a first audio file. The method may include presenting a soundmark, the soundmark indicating that second narrated content from a second audio file is available for presentation. The method may include receiving a request to present the second narrated content, and causing presentation of the second audio file.

20 Claims, 6 Drawing Sheets

SOUNDMARK INDICATING AVAILABILITY OF CONTENT SUPPLEMENTAL TO AUDIO CONTENT

BACKGROUND

Devices are increasingly able to present multiple types of content. When a device is presenting content, the device may present additional content that confuses the audience. In particular, when a device presents audio such as the reading of a book, when the book has additional content such as a footnote, the device may present the footnote content in a way that is confusing to the audience because the audience may be unable to discern which content is part of a story and which content is from the footnote. Therefore, devices may benefit from an improved way of presenting content that is supplemental to other content being presented.

Figure 1A:
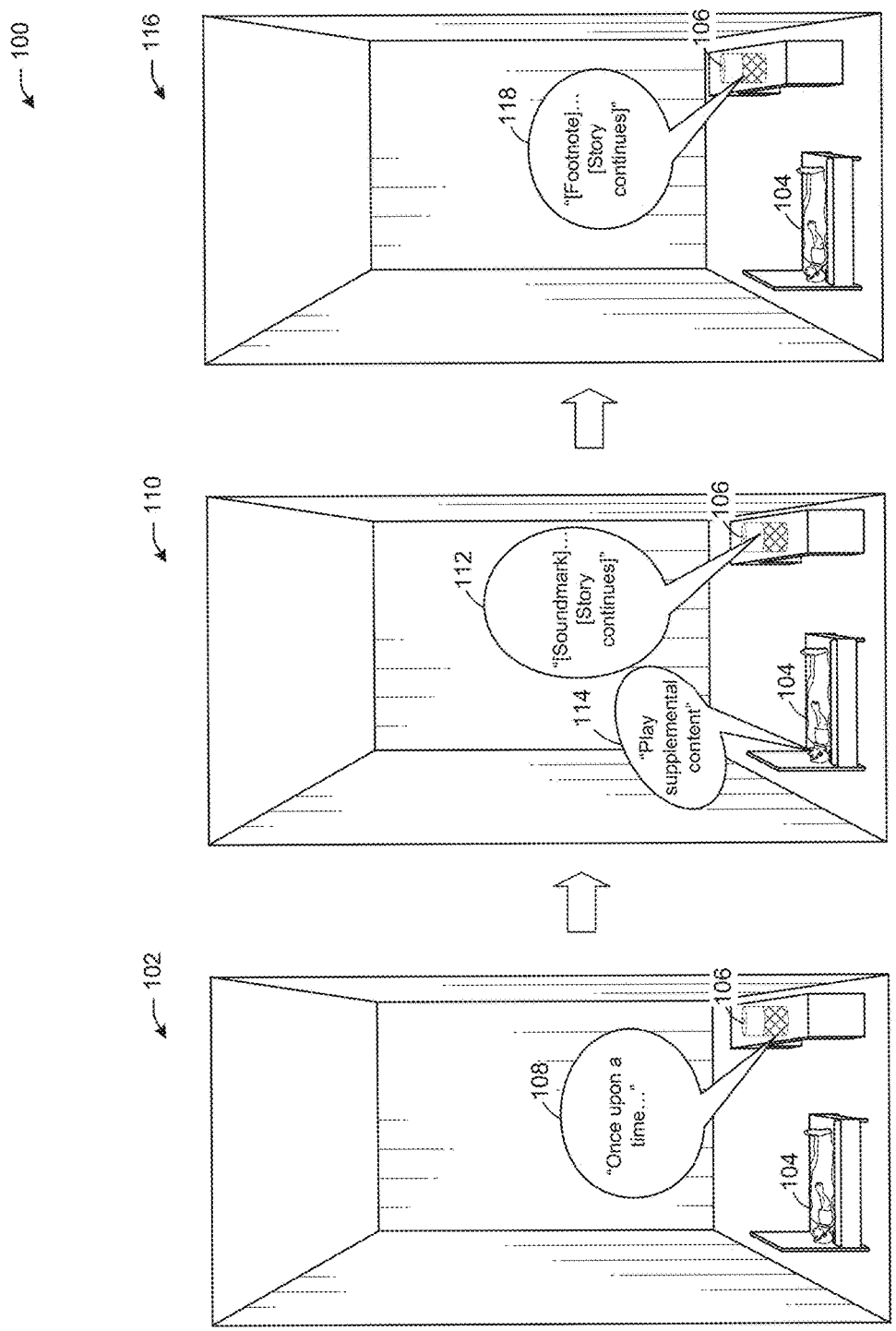
FIG. 1A illustrates an example process for using a soundmark to indicate availability of supplemental content, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using a soundmark to indicate availability of supplemental content.

Devices capable of presenting audio content may be capable of presenting content that is supplemental to the audio content. For example, when the audio content includes narration of an audio book, the device or another device may be capable of presenting content that is supplemental to the audio book content, such as footnote or endnote content for the audio book, images, audio or video clips (e.g., music, animation, etc.) that corresponds to the audio book narration.

Some devices that present audio book content may narrate footnote or endnote content in-line with the narration of the story. For example, when a footnote or endnote in the text of a narrated audio book occurs at the end of a sentence, some devices may present the narration of the text that corresponds to the footnote or endnote (e.g., by skipping to the footnote or endnote content, reading the footnote or endnote content, and then returning to the next sentence of the text). Such narration can be confusing to the listener, and/or may result in narration of the footnote or endnote number as if the number were a word in the story.

Some devices that present audio book content may wait until the end of a section (e.g., chapter, page, etc.) before narrating all footnote or endnote content from the section. Such presentation may be difficult for a listener to discern which footnote or endnote corresponded with a particular portion of the narrated audio book content.

Some devices that present audio book content may not present supplemental content such as footnotes, endnotes, tables, charts, images, or supplemental audio (e.g., background noises, music, etc.).

Therefore, some devices may benefit from an enhanced ability to present supplemental content in a way that is convenient for an audience.

In one or more embodiments, a listener may be given an option to have a device present supplemental content. The option may be presented in the form of a "soundmark" (e.g., a notification sound such as a tone, beep, series of sounds, etc.) that indicate the presence of available supplemental content. Rather than stopping the narration of an audio book or presenting a soundmark while narrating content, for example, a device may present the soundmark in-line with the narrated content so that the soundmark does not interrupt the narrated content, and so that the listener has an option to have the device or another device present the supplemental content. A soundmark may be distinct for different types of content. For example, one soundmark may indicate to a listener that footnote or endnote content is available. Another soundmark may indicate to a listener that images are available. Another soundmark may indicate to a listener that charts or graphs are available. Another soundmark may indicate to a listener that additional audio (e.g., music) is available. Another soundmark may indicate to a listener that content promotions are available.

In one or more embodiments, the listener may indicate to a device a request to present the supplemental content corresponding to a soundmark (e.g., notification sound). The listener may provide a voice input (e.g., "Present supplemental content"), may provide a touch or gesture input (e.g., the touch or click of an icon or other graphic), or the listener may input user preferences that a device may analyze to determine whether the listener prefers to play the supplemental content and at a particular time (e.g., in-line, after a section concludes, etc.). Rather than reading the number of a footnote or the text of an endnote as if it were part of an audio book recording, for example, the presentation of a soundmark may indicate the presence of supplemental content such as footnote or endnote sentences to be read or displayed when requested by a listener.

In one or more embodiments, supplemental content may be presented by the device that provides the soundmark. For example, the device may pause playback of narrated audio book content to present requested supplemental content, and then may continue playback of the narrated audio book content after presenting the supplemental content. The continued playback may return to the time (e.g., location of a content file) at which the listener requested the presentation of supplemental content, or may return to a prior time, such as an automatic jump back (e.g., a few seconds) or a return to a previous section break (e.g., the beginning of a sentence or paragraph).

In one or more embodiments, supplemental content may be presented on a device different than the device that presents the soundmark. For example, when a device cannot display images, but presents the soundmark during presentation of audio content, a listener's request to present the supplemental content may result in the presentation of images or other supplemental content on another device (e.g., a smartphone, tablet, television, or the like).

In one or more embodiments, soundmarks may be included in a same audio file as the audio content being presented (e.g., a file with narrated audio book content). In this manner, the soundmark may be presented as if it were a narrated portion of the audio book, thereby avoiding the playing of a soundmark over a narrated story. The location of text and soundmarks in the audio file may be used to determine the supplemental content to present. For example, an audio file may include multiple soundmarks, and when a listener requests playback of corresponding supplemental content, a device may use the location of the audio file at which the listener requests supplemental content to identify the corresponding soundmark and the supplemental content that corresponds to the soundmark. Supplemental content may be included in a separate file. In this manner, when a listener requests presentation of supplemental content, a device may pause playback of the content in the audio book file to present the supplemental content from the separate supplemental content file, and then may resume playback of the audio book file. The device may use a content synchronization file to determine which soundmarks in an audio book file correspond to which supplemental content in the separate supplemental content file. The content synchronization file may indicate the location at which any text of the audio book file is presented as audio, and may indicate the corresponding location of a soundmark in the separate supplemental content file. The device may use this location information to determine the location in the separate supplemental content file at which to begin presentation of supplemental content, and the location in the separate supplemental content file at which to stop presentation of the supplemental content and return to the presentation of the audio book content.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1A illustrates an example process 100 for using a soundmark to indicate availability of supplemental content, in accordance with one or more example embodiments of the present disclosure.

Referring to FIG. 1A, the process 100 may include step 102, in which a user 104 listens to a device 106 presenting first audio content 108 (e.g., the narration of an audio book). At step 110, the device 106 may present second audio content 112, which may include a soundmark (e.g., notification sound) followed by continued presentation of narrated audio book content. The user 104 may utter a voice utterance 114 requesting presentation of the supplemental content indicated by the soundmark (e.g., "Play supplemental content"). At step 116, the device 106 may present third audio content 118, which may include the presentation of the supplemental content corresponding to the soundmark, and then the continued presentation of the audio book content.

Figure 1B:
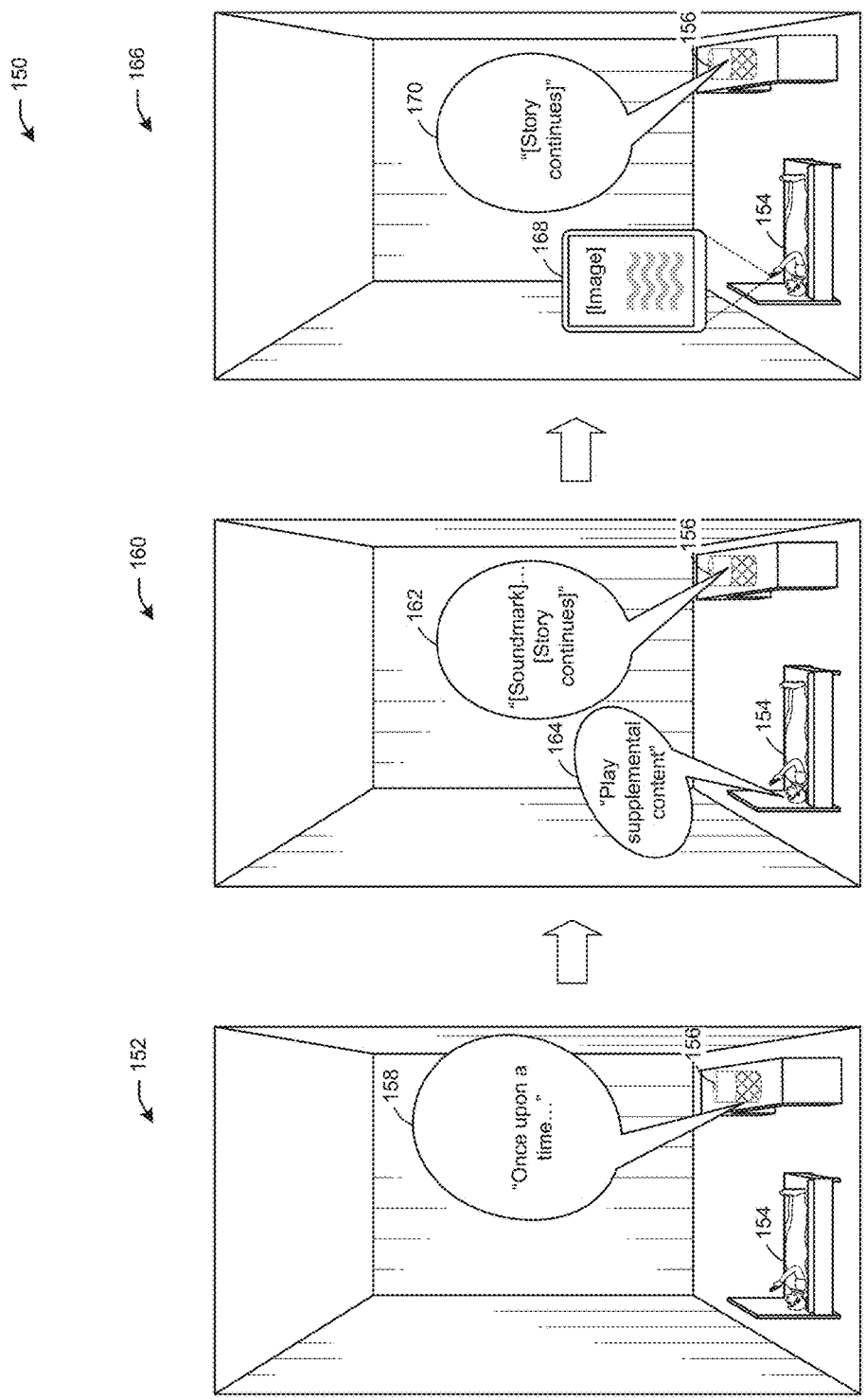
FIG. 1B illustrates an example process for using a soundmark to indicate availability of supplemental content, in accordance with one or more example embodiments of the present disclosure.

FIG. 1B illustrates an example process 150 for using a soundmark to indicate availability of supplemental content, in accordance with one or more example embodiments of the present disclosure.

Referring to FIG. 1B, the process 150 may include step 152, in which a user 154 listens to a device 156 presenting first audio content 158 (e.g., the narration of an audio book). At step 160, the device 156 may present second audio content 162, which may include a soundmark (e.g., notification sound) followed by continued presentation of narrated audio book content. The user 154 may utter a voice utterance 164 requesting presentation of the supplemental content indicated by the soundmark (e.g., "Play supplemental content"). At step 166, a second device 168 may present supplemental content (e.g., an image, chart, additional text, or the like), and the device 170 may present third audio content, which may include the continued presentation of the audio book content.

Referring to FIG. 1A and FIG. 1B, the "story" presented may be any audio, such as a narrated audio book, music, narrated games, answers to user questions, or the like. The supplemental content may include additional audio, such as audio or video clips corresponding to the content (e.g., music to accompany a story, video to accompany music, etc.), narrated footnote or endnote content, images such as charts or graphs, text representing additional information and/or footnote or endnote content, and/or promotional offers presented using narration and/or via text or images.

In one or more embodiments, the device 106 and the device 156 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2:
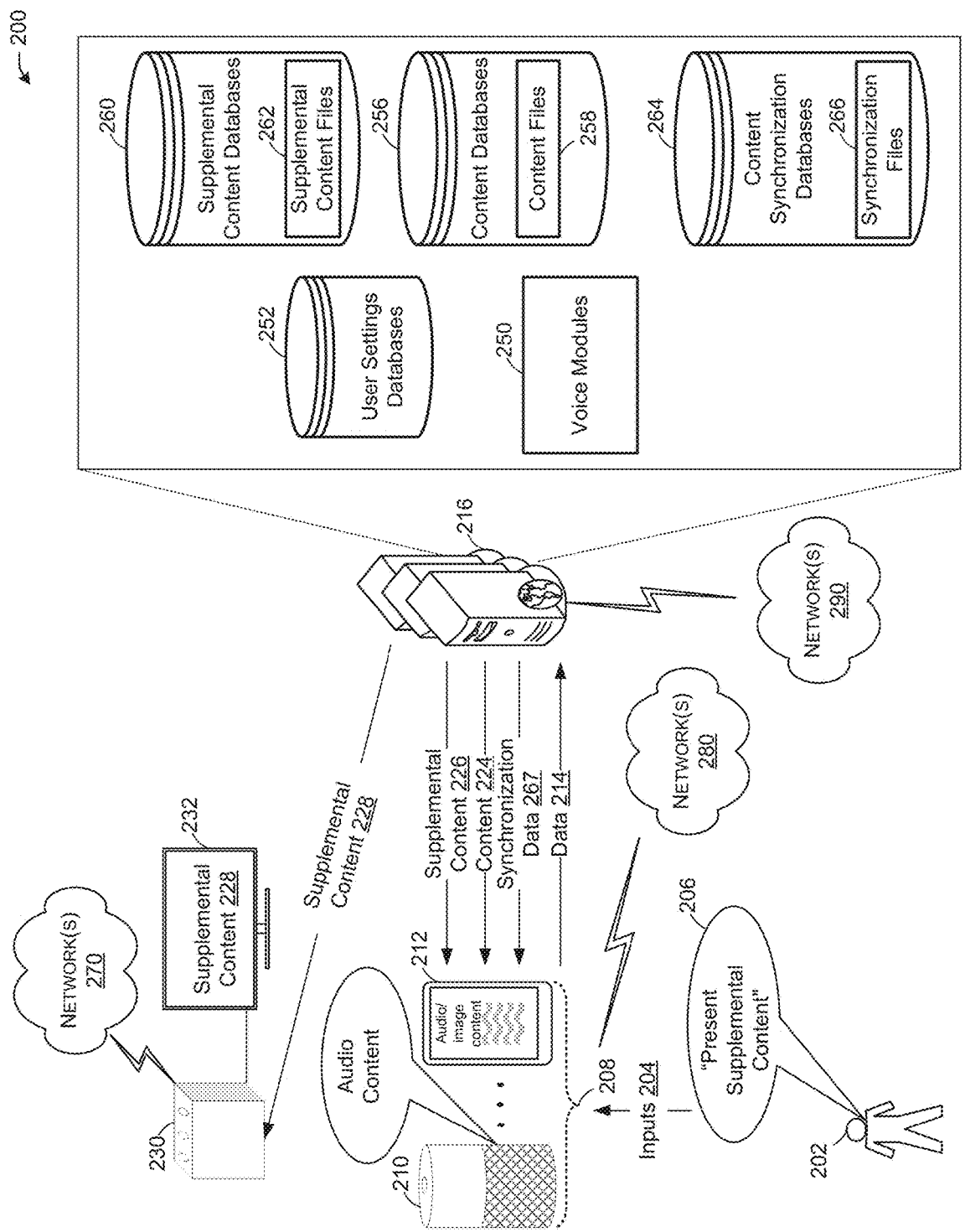
FIG. 2 illustrates a system for using a soundmark to indicate availability of supplemental content, in accordance with one or more example embodiments of the present disclosure.

FIG. 2 illustrates a system 200 for using a soundmark to indicate availability of supplemental content, in accordance with one or more example embodiments of the present disclosure.

Referring to FIG. 2, the system 200 may include a user 202 (e.g., similar to the user 104 of FIG. 1A or the user 154 of FIG. 1B) who may provide inputs 204 (e.g., voice utterances 206 or other physical inputs, such as button pushes, gestures, swipes, etc.) to one or more devices 208 (e.g., including device 210 and/or device 212, which may be similar to the device 106 of FIG. 1A and/or the device 156 of FIG. 1B, and which may or may not be voice-enabled). The one or more devices 208 may send data 214 (e.g., voice utterances, indications of received inputs/commands, device identifier data, information related to the user 202, etc.) to one or more remote servers 216 (e.g., a cloud-based server). The one or more remote servers 216 may analyze the data 214 and determine content 224 to be presented by the one or more devices 208, supplemental content 226 to be presented by the one or more devices 208, and supplemental content 228 to be presented by one or more other devices (e.g., a streaming media device 230, which may output the supplemental content 228 to a display 232 for presentation). For example, the content 224, the supplemental content 226, and the supplemental content 228 may include audio book content, e-book content, game content, video content, online application content, voice narration content (e.g., narration of questions, comments, statements, jokes, and the like presented as audio and/or video by the one or more devices 208), and the like. The supplemental content 226 and the supplemental content 228 may be the same type of content (e.g., text, images, video, audio, graphs, footnote or endnote content, etc.) as the content 224, or may be a different type of content than the content 224.

Still referring to FIG. 2, the one or more remote servers 216 may include or otherwise be associated with one or more voice modules 250, one or more user settings databases 252, one or more content databases 256 storing content files 258 (e.g., the content 224 may include the content files 258), one or more supplemental content databases 260 storing supplemental content files 262 (e.g., the supplemental content 226 and the supplemental content 228 may include the supplemental content files 262), and one or more content synchronization databases 264 storing synchronization files 266 (e.g., the one or more remote servers 216 may provide synchronization data 267 to the one or more devices 208, the synchronization data 267 including the synchronization files 266). The one or more voice modules 250 may analyze the data 214 to convert audio data (e.g., when the data 214 includes audio data, such as voice utterances) to an intention (e.g., an intention to play music or audio books, an intention to ask a question, an intention to play supplemental content, etc.). The one or more remote servers 216 may identify the content files 258, and the one or more remote servers 216 may send the content 224 in the form of the content files 258 to the one or more devices. The one or more remote servers 216 may identify the supplemental content 226 and the supplemental content 228 in the form of the supplemental content files 262, and the one or more remote servers 216 may send the supplemental content 226 and the content 228 in the form of the supplemental content files 262.

In one or more embodiments, the one or more devices 208 the content files 258, the supplemental content files 262, and the synchronization files 266 from the one or more remote servers 216. The one or more devices 208 may present the content 224 by executing the content files 258. A content file may represent audio book content (e.g., narration of a book), and may include soundmarks (e.g., notification sounds) in between narrated words. When the inputs 204 include a request to play the supplemental content 226, or when data in the one or more user settings databases 252 includes an indication that the user 202 prefers the presentation of the supplemental content 226 (e.g., the one or more devices 208 may receive user settings data from the one or more remote servers 216 or the user 202 may set such user settings at the one or more device 208), the one or more devices may use a synchronization file to determine which soundmark for which the user 202 requested presentation of the supplemental content 226 (e.g., the one or more devices 208 may determine the time/location in a content file at which the user 202 requested the presentation of the supplemental content 226 and may find the nearest previously played soundmark in the audio file). Once the one or more devices 208 have identified the relevant soundmark, the one or more devices 208 may identify in a synchronization file the corresponding time/location at which the supplemental content 226 corresponding to the soundmark occurs in a supplemental content file that may include all of the supplemental content that corresponds to the content file being executed for presentation. For example, the synchronization file may indicate that a soundmark presented at time/location X in the content file is presented at time/location Y in the supplemental content file. The one or more devices 208 may execute the supplemental content file at time/location Y. The synchronization file may indicate when/where the requested supplemental content 226 ends in the supplemental content file, and the one or more devices 208 may stop execution of the supplemental content file at that time and resume execution of the audio file at or before the time/location when the one or more devices 208 identified the user's request to present the supplemental content corresponding to a soundmark. In this manner, a supplemental content file may include any supplemental content for a content file, and the one or more devices 208 may use a synchronization file to identify the time/location at which to execute the supplemental content file to present requested supplemental content, and to identify the time/location at which to resume playback of the content file after presenting the supplemental content corresponding to a soundmark for which the user 202 requests presentation of the supplemental content 226.

In one or more embodiments, the one or more devices 208 may determine that the supplemental content corresponding to a soundmark for which the user 202 requests presentation of supplemental content may be supplemental content to be presented by another device (e.g., may be the supplemental content 228 instead of the supplemental content 226). The data 214 sent to the one or more remote servers 216 may include an indication of a user request to present the supplemental content 228, and the one or more remote servers 216 may determine the supplemental content 228 and the device to present the supplemental content 228. For example, when the supplemental content 228 is visual content that cannot be presented by the device 210 or is additional audio content to play concurrently with the content 224, the one or more remote servers 216 may send the supplemental content 226 to the device 212 and/or may send the supplemental content 228 to the streaming media device 230 for presentation. In this manner, the user 202 may be presented with images, video, or additional audio content (e.g., music samples that play with the content 224) using multiple devices.

Examples, as described herein, may include or may operate on logic or a number of components, modules, or mechanisms. Modules, such as the one or more voice modules 250, may be tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

In one or more embodiments, the supplemental content 226 and the supplemental content 228 may include instructions to present the content. For example, when the data 214 includes voice utterance data, the one or more voice modules 250 may determine that the voice utterance indicates a request to present the supplemental content 228, and that the streaming media device 230 rather than the device 210 is to present the supplemental content 228 (e.g., because the supplemental content 228 may include text or images requiring the display 232). When the one or more voice modules 250 determines that voice utterance data indicates a request to play the supplemental content using the device 210, the supplemental content 226 may include an instruction to present the supplemental content 226, which may cause the device 210 to pause playback of the content 224, to present the supplemental content 226, and to resume playback of the content 224. Alternatively, a supplemental content file may include metadata indicative of whether the one or more devices 208 may present any particular portion of supplemental content from a supplemental content file. When the inputs 204 include an indication of a request to play supplemental content, the one or more devices 208 may identify the corresponding supplemental content in the manner described above using a synchronization file, and may determine using a supplemental content file that the one or more devices 208 are to present the supplemental content 226 or whether another device is to present supplemental content. When the metadata indicates that another device is to present the supplemental content, the data 214 sent to the one or more remote servers 216 may be used by the one or more remote servers 216 to determine the device needed to present the supplemental content 228.

In one or more embodiments, the device 210 may present the content 224 as provided by the device 212. For example, the audio content may be sent from the device 212 to the device 210 (e.g., via a Bluetooth connection) for presentation. The device 212 may receive the inputs 204 indicating a request to present the supplemental content 226, and either the device 212 may present the supplemental content 226, or the device 212 may send an indication of the request to the device 210 to present the supplemental content. Alternatively, the device 212 may include in the data 214 an indication of the request to present supplemental content, and the one or more remote servers 216 may send instructions to a device to present the supplemental content (e.g., the supplemental content 226 and/or the supplemental content 228).

The streaming media device 230 may be configured to communicate via a communications network 270, the one or more devices 208 may be configured to communicate via a communications network 280, and the one or more remote servers 216 may be configured to communicate via a communications network 290, wirelessly or wired (e.g., the same or different wireless communications networks). The communications network 270, the communications network 280, and/or the communications network 290 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 270, the communications network 280, and/or the communications network 290 may have any suitable communication range associated therewith and may include, for example, global networks (e.g., the Internet), metropolitan area networks (MANs), wide area networks (WANs), local area networks (LANs), or personal area networks (PANs). In addition, communications network 270, the communications network 280, and/or the communications network 290 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more devices 208 and/or the one or more remote servers 216 may include any suitable processor-driven device including, but not limited to, a mobile device or a non-mobile, e.g., a static, device. For example, the one or more devices 208 and/or the one or more remote servers 216 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

In one or more embodiments, the one or more devices 208 may include one or more microphones (not shown) for capturing the voice utterance 206. The one or more devices 208 may include a hardware processor (not shown), a graphics processing unit (not shown), a hardware processor core (not shown), or any combination thereof, a main memory (not shown) and a static memory (not shown), some or all of which may communicate with each other via an interlink (not shown). The one or more devices 208 may further include a power management device (not shown), a graphics display device (not shown), an alphanumeric input device (e.g., a keyboard, touch pad, buttons—not shown), and a user interface (UI) navigation device (e.g., a mouse—not shown). In an example, the graphics display device, alphanumeric input device, and UI navigation device may be a touch screen display. The one or more devices 208 may additionally include a storage device (i.e., drive unit—not shown), a signal generation device (not shown), a network interface device/transceiver (not shown) coupled to antenna (s) (not shown), and one or more sensors (not shown), such as a global positioning system (GPS) sensor, a compass, an accelerometer, or other sensor. The one or more devices 208 may include an output controller (not shown), such as a serial (e.g., universal serial bus (USB), parallel, or other wired or wireless (e.g., infrared (IR), near field communication (NFC), etc.) connection to communicate with or control one or more peripheral devices (e.g., a display, stereo receiver, media device, etc.)).

Figure 3:
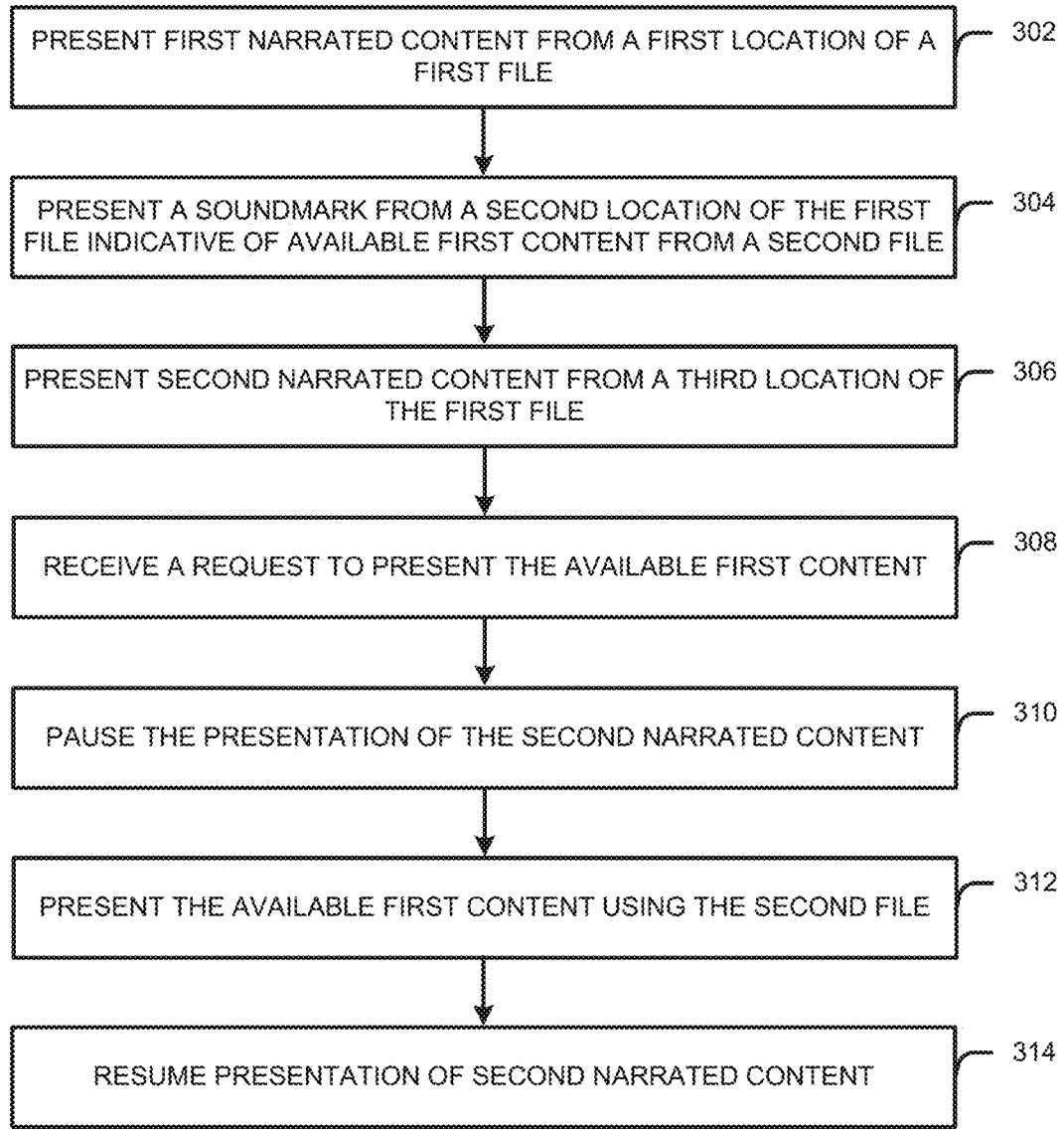
FIG. 3 illustrates a flow diagram for a process for using a soundmark to indicate availability of supplemental content, in accordance with one or more example embodiments of the present disclosure.

FIG. 3 illustrates a flow diagram for a process 300 for using a soundmark to indicate availability of supplemental content, in accordance with one or more example embodiments of the present disclosure.

At block 302, a device (or system, or apparatus, etc., e.g., the device 106 of FIG. 1A, the device 156 of FIG. 1B, the one or more devices 208 of FIG. 2) may present first narrated content (e.g., the content 224 of FIG. 2) from a first location or time of a first file (e.g., a content file of the content files 258 of FIG. 2). The first narrated content may include a narration of an audio book, a voice answer to a question, narration or voices from a game, and the like. The device may present the first narrated content by executing a content file that causes presentation when executed (e.g., an audio file or other multimedia file).

At block 304, the device may present a soundmark (e.g., a notification sound such as a beep, tone, series of beeps or tones, one or more sounds, or the like) from a second location or time of the first file. For example, the first file may include text narrated as the first narrated content and one or more soundmarks indicating available first content (e.g., the supplemental content 226 and/or the supplemental content 228 of FIG. 2) for presentation using the device or another device. When the first file includes audio book content (e.g., text from a book that is narrated using one or more voices), and when the book that includes the text that is narrated includes content supplemental to the narration (e.g., images, video, music, footnotes or endnotes, tables, graphs, charts, etc.), the soundmark may distinctly indicate the presence of specific supplemental content (e.g., one soundmark sound may indicate the availability of images, another soundmark may indicate the availability of footnotes or endnotes, another soundmark may indicate supplemental audio content such as music, and the like). The device at any time may present narrated instructions or other audio to indicate which soundmark corresponds to which type of supplemental content, thereby allowing a user to request that some supplemental content indicated by a soundmark is presented while opting to skip other supplemental content indicated by another soundmark. The supplemental content for the first narrated content may be presented by executing a second file (e.g., a supplemental content file of the supplemental content files 262 of FIG. 2). The device may present soundmarks as if part of narrated text of an audio book or other audio transcript, thereby allowing soundmarks to be presented without playing over the first narrated content (e.g., so that a listener may hear both the first narrated content and the soundmark).

At block 306, the device may present second narrated content from a third location or time of the first file. For example, the device may narrate the first narrated content, such as, "The 43$^{rd}$ President of the United States was George W. Bush," followed by the soundmark, followed by second narrated content of the first file, such as, "The 44$^{th}$ President of the United States was Barack Obama." Presentation of the soundmark may occur in between presentation of the first and second narrated content because the soundmark may be represented in a content file (the first file) as a soundmark (e.g., using a symbol or sequence of characters recognized as a soundmark rather than a narrated word), so the soundmark may be presented as if a narrated word of the text, resulting in a tone or beep in between sentences.

At block 308, the device may receive a request to present the available first content (e.g., the supplemental content indicated by the soundmark). The request may be received as one or more inputs from a listener (e.g., the inputs 204 of FIG. 2), such as using voice inputs (e.g., "Play the supplemental content"), touch inputs, gestures, or other inputs. The device may detect a touch or gesture input, and may translate the input into one or more commands, such as to present the supplemental content. When the request is a voice utterance, the device may send voice data (e.g., the data 214 of FIG. 2) representing the voice utterance to a remote network (e.g., the one or more remote servers 216 of FIG. 2) for translation, and may receive corresponding commands from the remote network, such as commands to present particular supplemental content (e.g., the available first content at a particular location or time in the second file). Alternatively, the device may have user preferences set by a user or received from the remote network, the preferences indicating that the listener prefers presentation of certain types of supplemental content, all supplemental content, or not supplemental content, and when (e.g., immediately, at a next section break, at the end of the first file, etc.). The request may include an indication of the device with which to present the available first content, whether the requested device is the device or another device.

At block 310, the device may pause presentation of the second narrated content (e.g., may pause presentation of playback of the content in the first file). The device may use a synchronization file (e.g., of the synchronization files 266 of FIG. 2) to determine when words of the first file are presented, and may determine a stopping point at which to pause playback, such as at the end of a sentence or paragraph, or the device may pause playback immediately upon determining that the listener prefers presentation of the available first content using the device. When the supplemental content is to be presented using another device, the device may continue playback of the content in the first file without pausing, or may pause the playback for a time to allow for presentation of the available first content using another device.

At block 312, the device may present the available first content using the second file. The device may use the synchronization file as described at block 310 to determine when the determination to present the available first content was made, when/where the most recent (e.g., proximate) soundmark was located in the first file, and when/where the available first content corresponding to the soundmark is located in the second file. The device may execute the second file at the location or time in the second file that corresponds to the beginning of the available first content, and may stop execution of the second file at the location or time in the second file (e.g., as indicated by the synchronization file) that the available first content ends (e.g., because additional supplemental content may follow in the second file, and may correspond to later content in the first file).

At block 314, the device may resume presentation of the second narrated content using the first file. The device may resume execution of the first file at the exact time when the execution of the first file was paused at block 310, or may resume playback at an earlier location or time in the first file, such as a previous section break (e.g., as indicated by the synchronization file). In this manner, the device may present supplemental content in a way that allows a listener to decide which supplemental content to present and when, and that allows a user to return seamlessly to playback of content that was paused to allow for presentation of supplemental content (e.g., so the listener does not forget what was said before the presentation of the supplemental content).

In one or more embodiments, the device may cause presentation of the available first content using the device or may cause presentation of the available first content at another device. For example, the device may send an indication of the request to present the available first content to another device (e.g., a client device capable of presenting the available first content, or to a remote network, which may notify a client device capable of presenting the available first content).

Figure 4:
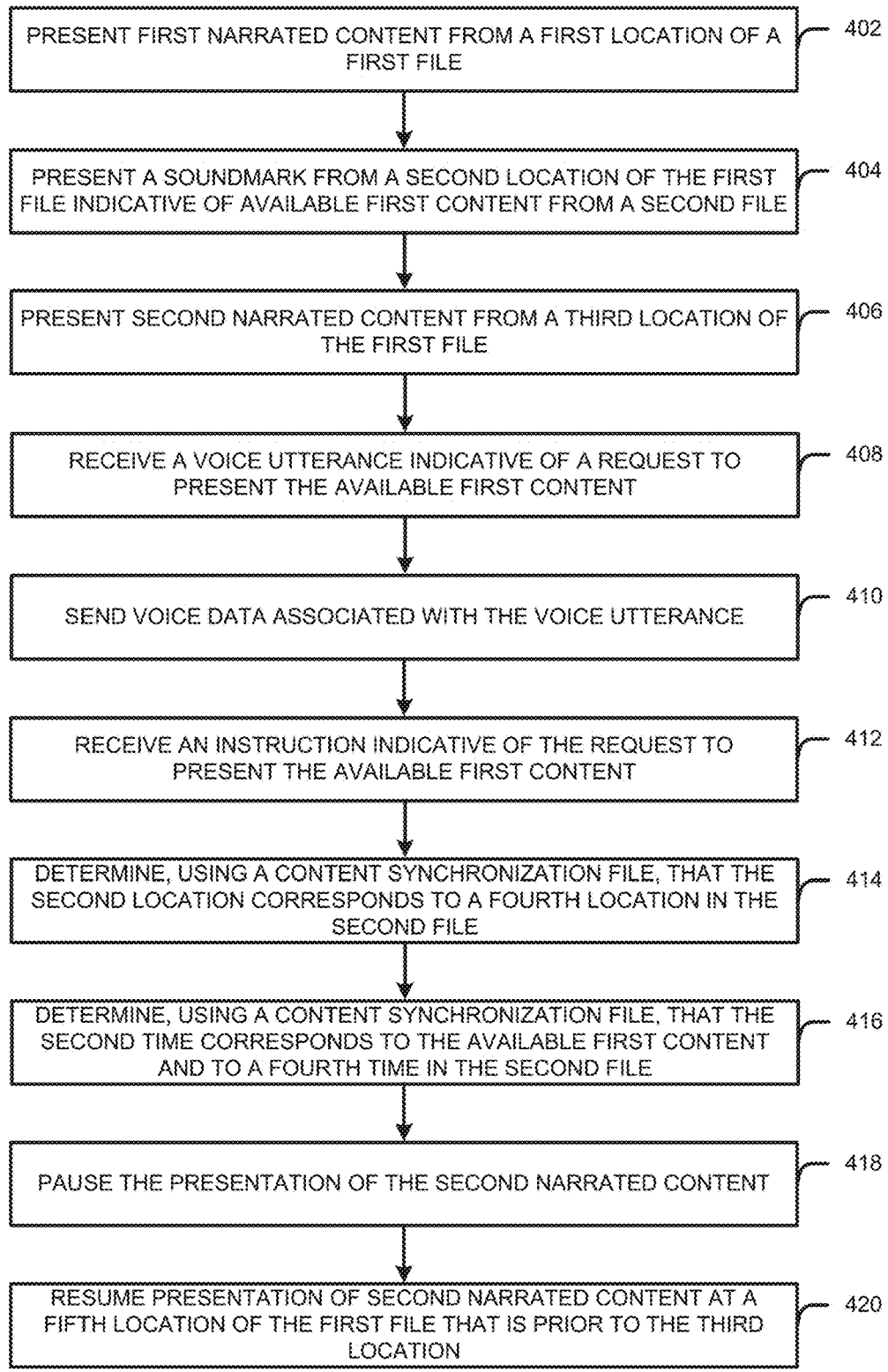
FIG. 4 illustrates a flow diagram for a process for using a soundmark to indicate availability of supplemental content, in accordance with one or more example embodiments of the present disclosure.

FIG. 4 illustrates a flow diagram for a process 400 for using a soundmark to indicate availability of supplemental content, in accordance with one or more example embodiments of the present disclosure.

At block 402, a device (or system, or apparatus, etc., e.g., the device 106 of FIG. 1A, the device 156 of FIG. 1B, the one or more devices 208 of FIG. 2) may present first narrated content (e.g., the content 224 of FIG. 2) from a first location or time of a first file (e.g., a content file of the content files 258 of FIG. 2). The first narrated content may include a narration of an audio book, a voice answer to a question, narration or voices from a game, and the like. The device may present the first narrated content by executing a content file that causes presentation when executed (e.g., an audio file or other multimedia file).

At block 404, the device may present a soundmark (e.g., a notification sound such as a beep, tone, series of beeps or tones, one or more sounds, or the like) from a second location or time of the first file. For example, the first file may include text narrated as the first narrated content and one or more soundmarks indicating available first content (e.g., the supplemental content 226 and/or the supplemental content 228 of FIG. 2) for presentation using the device or another device. When the first file includes audio book content (e.g., text from a book that is narrated using one or more voices), and when the book that includes the text that is narrated includes content supplemental to the narration (e.g., images, video, music, footnotes or endnotes, tables, graphs, charts, etc.), the soundmark may distinctly indicate the presence of specific supplemental content (e.g., one soundmark sound may indicate the availability of images, another soundmark may indicate the availability of footnotes or endnotes, another soundmark may indicate supplemental audio content such as music, and the like). The device at any time may present narrated instructions or other audio to indicate which soundmark corresponds to which type of supplemental content, thereby allowing a user to request that some supplemental content indicated by a soundmark is presented while opting to skip other supplemental content indicated by another soundmark. The supplemental content for the first narrated content may be presented by executing a second file (e.g., a supplemental content file of the supplemental content files 262 of FIG. 2). The device may present soundmarks as if part of narrated text of an audio book or other audio transcript, thereby allowing soundmarks to be presented without playing over the first narrated content (e.g., so that a listener may hear both the first narrated content and the soundmark).

At block 406, the device may present second narrated content from a third location or time of the first file. For example, the device may narrate the first narrated content, such as a paragraph of a book, followed by the soundmark, followed by second narrated content of the first file, such as a second paragraph of the book. Presentation of the soundmark may occur in between presentation of the first and second narrated content because the soundmark may be represented in a content file (the first file) as a soundmark (e.g., using a symbol or sequence of characters recognized as a soundmark rather than a narrated word), so the soundmark may be presented as if a narrated word of the text, resulting in a tone or beep in between sentences.

At block 408, the device may receive a voice-uttered request to present the available first content (e.g., the supplemental content indicated by the soundmark). The voice utterance may indicate that the listener prefers to see or hear the available first content. For example, the voice utterance may include, "Play the supplemental content," "Present the image," "Present the footnote," "Present the endnote," "Present the music," "Present the promotion," and the like. The request may include an indication of the device with which to present the available first content, whether the requested device is the device or another device.

At block 410, the device may send voice data associated with the voice utterance to a remote network (e.g., the one or more remote servers 216 of FIG. 2). The voice data may include a representation of the voice utterance received by the device, and the remote network may translate the voice utterance to determine what a user said. When the voice utterance includes a request to present supplemental content, such as a request to "Present the supplemental content," the device may send the voice data to the remote network, which may determine that "Present the supplemental content" indicates a request to present the available first content from the second file (e.g., execute the second file at a particular time or location).

At block 412, the device may receive an instruction indicative of the request to present the available first content. For example, the remote network may determine that the voice utterance indicates a request to present the available first content from the second file, and that the device may execute the second file to cause presentation of the available first content. The remote network may send to the device the instruction, which may indicate that the device is to present supplemental content from the second file.

At block 414, the device may determine, using a content synchronization file (e.g., one of the content synchronization files 266 of FIG. 2 corresponding to the first file and to a second file that includes supplemental content for the first file), the most recently presented (e.g., most proximate) soundmark (e.g., based on the time or location of the playback of the first file), and may determine the time or location of the most recent soundmark in the first file. A soundmark may be identified using special characters or strings of alpha and/or numeric characters that, when the first file is executed, result in presentation of the soundmark rather than the characters used to identify the soundmark in the first file. The device may identify, from the current location or time of the first file, the most recently presented soundmark in the first file.

At block 416, the device may determine, using the content synchronization file, that the time or location at which the soundmark occurs in the first file corresponds to the available first content, and that the available first content occurs at a time or location in the second file. The synchronization file may indicate the time or location of the soundmark in the first file and the corresponding time or location of the available first content in the second file.

At block 418, the device may pause the presentation of the first file (e.g., pause the execution of the first file during the presentation of the second narrated content) and present the available first content. The device may, upon identifying the instruction to present the available first content, pause the current presentation of the content in the first file immediately, or may use the first file to determine an upcoming breaking point, such as the end of a sentence or paragraph. The device may maintain an index of the time or location of the pause in the first file. The device may execute the second file at the time or location of the second file (e.g., the fourth time), and may stop presentation of the available first content at a location or time when the available first content ends (e.g., as indicated by the content synchronization file) so as to avoid presenting additional supplemental content of the second file that does not correspond to the time or location of the first file.

At block 420, the device may stop presenting the available first content (e.g., may stop executing the second file at a time or location in the second file when the available first content ends, which may be indicated by the synchronization file), and may resume presentation of the first file (e.g., the second narrated content of the first file). The device may resume presentation at the exact time or location in the first file at which the device paused presentation of the content in the first file, or may resume presentation at a previous breaking point, such as the beginning of a sentence or paragraph, as indicated by the synchronization file.

In one or more embodiments, when the device receives the instruction to present the available first content at block 412, there may be some situations in which the device does not immediately pause and present the available first content (or even determine where the available first content is at block 414 and block 416) at block 418. For example, the device may be in a particular mode, such as a driving mode, and the supplemental content may include images or text. Instead of presenting the images or text, the device may present an indication, such as another soundmark or other type of notification, that the supplemental content may be available for subsequent presentation upon user selection when the device is no longer in driving mode or any mode that may prevent the presentation of some forms of supplemental content.

Referring to FIG. 3 and FIG. 4, the device may provide a feedback mechanism (e.g., a feedback request) to confirm whether the available first content was presented correctly (e.g., was the supplemental content presented at all, at the correct device, at the correct time, without undermining the listener's ability to keep track of the main audio content, etc.). The device may present a voice-uttered question, text, or graphic such as, "Was the supplemental content presented correctly?" and the listener may provide a voice-uttered response, a touch, a gesture, or other selection (e.g., a "Yes/No" selection) that the device may use to determine whether the supplemental content was presented as the listener preferred. When the listener's response is a voice-utterance, the device may send voice data for the voice utterance to the remote network for analysis. The device or the remote network may use the listener's feedback to determine when the supplemental content was not presented correctly, and may present or provide the option to present the supplemental content on a different device, or to present the proper supplemental content once identified correctly.

Figure 5:
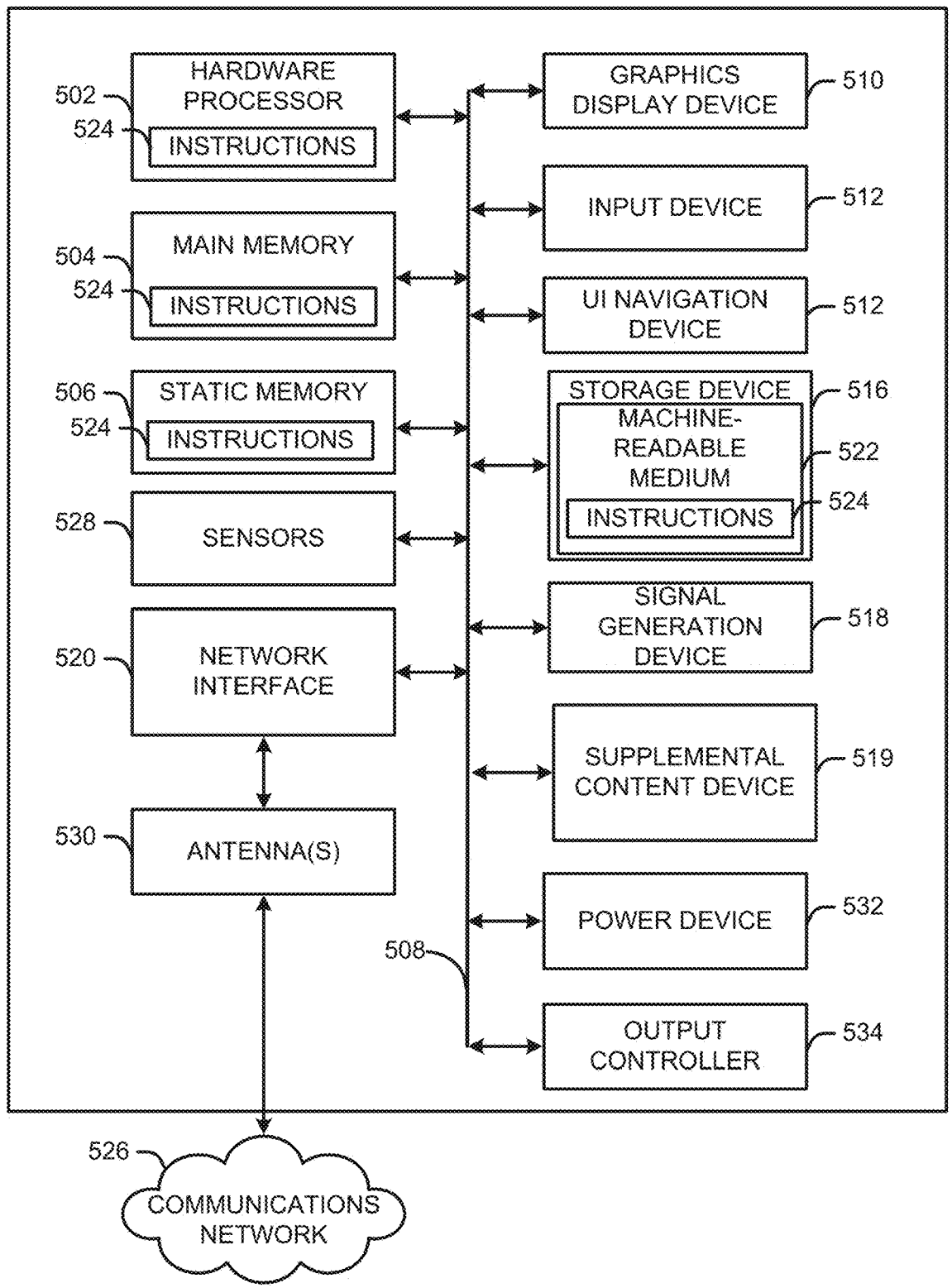
FIG. 5 illustrates a block diagram of an example machine upon which any of one or more techniques (e.g., methods) may be performed, in accordance with one or more example embodiments of the present disclosure.

FIG. 5 illustrates a block diagram of an example of a machine 500 (e.g., the device 106 of FIG. 1A, the device 156 of FIG. 1B, the one or more devices 208 of FIG. 2) or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in Wi-Fi direct, peer-to-peer (P2P), cellular, (or other distributed) network environments. The machine 500 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module.

For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518, a supplemental content device 519, a network interface device/transceiver 520 coupled to antenna(s) 530, and one or more sensors 528, such as a microphone, a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The supplemental content device 519 may carry out or perform any of the operations and processes (e.g., process 300 of FIG. 3, process 400 of FIG. 4) described and shown above.

In one or more embodiments, the supplemental content device 519 may present an option to have a device present supplemental content. The option may be presented in the form of a soundmark (e.g., a tone, beep, series of sounds, etc.) that indicate the presence of available supplemental content. Rather than stopping the narration of an audio book or presenting a soundmark while narrating content, for example, a device may present the soundmark in-line with the narrated content so that the soundmark does not interrupt the narrated content, and so that the listener has an option to have the device or another device present the supplemental content. A soundmark may be distinct for different types of content. For example, one soundmark may indicate to a listener that footnote or endnote content is available. Another soundmark may indicate to a listener that images are available. Another soundmark may indicate to a listener that charts or graphs are available. Another soundmark may indicate to a listener that additional audio (e.g., music) is available. Another soundmark may indicate to a listener that content promotions are available.

In one or more embodiments, a listener may indicate to a device a request to present the supplemental content corresponding to a soundmark. The listener may provide a voice input (e.g., "Present supplemental content"), may provide a touch or gesture input (e.g., the touch or click of an icon or other graphic), or the listener may input user preferences that a device may analyze to determine whether the listener prefers to play the supplemental content and at a particular time (e.g., in-line, after a section concludes, etc.). The supplemental content device 519 may identify the request or identify a user preference indicative of a listener's preference to have the supplemental content presented. The supplemental content device 519 may identify that a voice-utterance was received and may facilitate sending voice data associated with the voice utterance to a remote network for analysis. The supplemental content device 519 may identify instructions received from the remote network indicating that the supplemental content is to be presented.

In one or more embodiments, the supplemental content device 519 may facilitate presentation of supplemental content at the device that provides the soundmark. For example, the device may pause playback of narrated audio book content to present requested supplemental content, and then may continue playback of the narrated audio book content after presenting the supplemental content. The continued playback may return to the time (e.g., location of a content file) at which the listener requested the presentation of supplemental content, or may return to a prior time, such as an automatic jump back (e.g., a few seconds) or a return to a previous section break (e.g., the beginning of a sentence or paragraph).

In one or more embodiments, soundmarks may be included in a same audio file as the audio content being presented (e.g., a file with narrated audio book content). In this manner, the supplemental content device 519 may facilitate presentation of the soundmark as if it were a narrated portion of the audio book, thereby avoiding the playing of a soundmark over a narrated story. The location of text and soundmarks in the audio file may be used by the supplemental content device 519 to determine the supplemental content to present. For example, an audio file may include multiple soundmarks, and when a listener requests playback of corresponding supplemental content, a device may use the location of the audio file at which the listener requests supplemental content to identify the corresponding soundmark and the supplemental content that corresponds to the soundmark. Supplemental content may be included in a separate file. In this manner, when a listener requests presentation of supplemental content, a device may pause playback of the content in the audio book file to present the supplemental content from the separate supplemental content file, and then may resume playback of the audio book file. The device may use a content synchronization file to determine which soundmarks in an audio book file correspond to which supplemental content in the separate supplemental content file. The content synchronization file may indicate the location at which any text of the audio book file is presented as audio, and may indicate the corresponding location of a soundmark in the separate supplemental content file. The device may use this location information to determine the location in the separate supplemental content file at which to begin presentation of supplemental content, and the location in the separate supplemental content file at which to stop presentation of the supplemental content and return to the presentation of the audio book content.

It is understood that the above are only a subset of what the supplemental content device 519 may be configured to perform and that other functions included throughout this disclosure may also be performed by the supplemental content device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V)

device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   presenting, by a device, first narrated content from a first audio file associated with a book, wherein the first narrated content begins at a first location in the first audio file;
   presenting a first soundmark, wherein the first soundmark indicates that second narrated content from a second audio file is available for presentation, and wherein the first soundmark begins at a second location in the first audio file after the first location;
   presenting third narrated content, wherein the third narrated content begins at a third location in the first audio file after the second location;
   receiving, at a first time after presentation of the first soundmark, a request to present content;
   determining that the first time is more proximal to the first soundmark in the first audio file than to a second soundmark that begins at a fourth location in the first audio file;
   determining, based on the determination that the first time is more proximal to the first soundmark in the first audio file than to the second soundmark in the first audio file, that the request corresponds to the first soundmark in the first audio file;
   determining, based on the determination that the request corresponds to the first soundmark in the first audio file, using a synchronization file, the synchronization file comprising locations of the first audio file and locations of the second audio file, that the second location in the first audio file corresponds to a fifth location in the second audio file;
   presenting, based on the request, the second audio file beginning at the fifth location; and
   presenting fourth narrated content from the first audio file.

2. The method of claim 1, further comprising:
   receiving a voice utterance indicative of the request;
   sending voice data associated with the voice utterance to a second device; and
   receiving an instruction to present the second narrated content, wherein receiving the request comprises receiving the instruction.

3. The method of claim 1, further comprising:
   determining, using the synchronization file, that the second narrated content begins at the fifth location in the second audio file and ends at a sixth location in the second audio file; and
   stopping presentation of the second audio file at the sixth location prior to presenting the fourth narrated content.

4. The method of claim 1, further comprising determining a sixth location in the first audio file prior to the third location, wherein presenting the fourth narrated content comprises executing the first audio file at the sixth location.

5. A method comprising:
   presenting, by a device, first audio content from a first audio file, wherein the first audio content begins at a first location in the first audio file;
   presenting a first notification sound from the first audio file, wherein the first notification sound indicates an option to present second content, and wherein the first notification sound begins at a second location in the first audio file after the first location;
   receiving, at a first time after the presentation of the first notification sound, a user request to present content;
   determining that the first time is more proximal to the first notification sound in the first audio file than to a second notification sound that begins at a third location in the first audio file;
   determining, based on the determination that the first time is more proximal to the first notification sound in the first audio file than to the second notification sound in the first audio file, that the user request corresponds to the first notification sound in the first audio file;
   determining, based on the determination that the user request corresponds to the first notification sound in the first audio file, using a synchronization file, the synchronization file comprising locations of the first audio file and locations of a second file, that the second location in the first audio file corresponds to a fourth location in the second file; and
   causing presentation of the second content from the fourth location in the second file based on the user request.

6. The method of claim 5, wherein presenting the second content comprises executing the second file at the fourth location.

7. The method of claim 6, further comprising:
   determining, using the synchronization file comprising the locations of the first audio file and the locations of the second file, that the second content begins at the fourth location in the second file and ends at a fifth location in the second file; and
   stopping presentation of the second file at the second location prior to resuming presentation of the first audio content.

8. The method of claim 5, wherein the second content comprises an image in a second file or text in the second file.

9. The method of claim 5, further comprising presenting a request for confirmation that the second content was presented.

10. The method of claim 5, further comprising:
pausing presentation of the first audio content; and
resuming presentation of the first audio content after causing presentation of the second content.

11. The method of claim 10, further comprising determining a fifth location in the first audio file prior to the first location, wherein resuming presentation of the first audio content comprises executing the first audio file at the fifth location.

12. The method of claim 5, wherein causing presentation of the second content comprises presenting, by the device, the second content.

13. The method of claim 5, further comprising:
presenting the second notification sound, wherein the second notification sound is associated with third content; and
receiving a voice utterance comprising an indication to present the third content, wherein causing presentation of the second content comprises sending voice data associated with the voice utterance to a second device.

14. The method of claim 5, further comprising:
receiving a voice utterance comprising the indication to present the second content and an indication of the device;
sending the indication of the device and voice data associated with the voice utterance to a second device; and
receiving an instruction to present the second content, wherein receiving the indication to present the second content comprises receiving the instruction.

15. The method of claim 5, wherein determining that the user request corresponds to the first notification sound comprises determining that the user request is unassociated with the second notification sound.

16. A device comprising memory coupled to at least one processor, the at least one processor configured to:
present first audio content from a first audio file, wherein the first audio content begins at a first location in the first audio file;
present a first notification sound from the first audio file, wherein the first notification sound indicates an option to present second content, and wherein the first notification sound begins at a second location in the first audio file after the first location;
receive, at a first time after the presentation of the first notification sound, a user request to present content;
determine that the first time is more proximal to the first notification sound in the first audio file than to a second notification sound that begins at a third location in the first audio file;
determine, based on the determination that the first time is more proximal to the first notification sound in the first audio file than to the second notification sound in the first audio file, that the user request to present content corresponds to the first notification sound in the first audio file;
determine, based on the user request, using a synchronization file, the synchronization file comprising locations of the first audio file and locations of a second file, that the second location in the first audio file corresponds to a fourth location in the second file; and
cause presentation of the second content from the fourth location in the second file based on the user request.

17. The device of claim 16, wherein to present the second content comprises the at least one processor being further configured to execute the second file at the fourth location.

18. The device of claim 16, wherein the at least one processor is further configured to:
determine, using the synchronization file, that the second content begins at the fourth location in the second file and ends at a fifth location in the second file; and
stop presentation of the second file at the second location prior to resuming presentation of the first audio content.

19. The device of claim 16, wherein the at least one processor is further configured to:
pause presentation of the first audio content; and
resume presentation of the first audio content after causing presentation of the second content.

20. The device of claim 16, wherein to determine that the user request corresponds to the first notification sound comprises to determine that the user request is unassociated with the second notification sound.

* * * * *